(12) United States Patent
Farano

(10) Patent No.: US 7,673,651 B2
(45) Date of Patent: Mar. 9, 2010

(54) FLOW REGULATING DEVICE

(75) Inventor: Michele Farano, Turin (IT)

(73) Assignee: Elbi International S.p.A., Turin (IT)

( * ) Notice: Subject to any disclaimer, the term of this patent is extended or adjusted under 35 U.S.C. 154(b) by 371 days.

(21) Appl. No.: 11/431,603

(22) Filed: May 11, 2006

(65) Prior Publication Data

US 2006/0278279 A1    Dec. 14, 2006

(30) Foreign Application Priority Data

May 11, 2005   (IT) .......................... TO20050060 U

(51) Int. Cl.
*F16K 15/06* (2006.01)

(52) U.S. Cl. .............................. 137/512.3; 137/543.13; 137/542; 137/543.23

(58) Field of Classification Search ................. 137/854, 137/543.23, 514.5, 512.1, 512.3, 512, 512.4, 137/512.15, 218, 542, 543.13, 543
See application file for complete search history.

(56) References Cited

U.S. PATENT DOCUMENTS

| 170,974 | A | * | 12/1875 | Westwater et al. | ..... | 137/543.13 |
| 275,697 | A | * | 4/1883 | Joyce et al. | ................. | 220/522 |
| 514,143 | A | * | 2/1894 | Brooks et al. | ................ | 137/504 |
| 1,275,697 | A | * | 8/1918 | Joyce et al. | ............ | 137/329.01 |
| 3,906,987 | A | * | 9/1975 | Rushforth et al. | ........... | 137/218 |
| 4,368,755 | A | * | 1/1983 | King | ........................ | 137/512.3 |
| 4,877,052 | A | * | 10/1989 | Toshio et al. | .............. | 137/512.3 |
| 5,148,828 | A | * | 9/1992 | Farnham | .................. | 137/454.6 |
| 6,089,260 | A | * | 7/2000 | Jaworski et al. | ............. | 137/512 |
| 7,448,408 | B2 | * | 11/2008 | Yumoto | ................. | 137/543.23 |
| 2004/0238042 | A1 | * | 12/2004 | Takeda | ....................... | 137/512 |

* cited by examiner

*Primary Examiner*—John Rivell
*Assistant Examiner*—Macade Brown
(74) *Attorney, Agent, or Firm*—Sughrue Mion, PLLC

(57) ABSTRACT

The device comprises a stationary body which has, defined inside it, a passage for a flow of liquid with at least one inlet opening and one outlet opening for the flow and in which at least one valve seat directed towards the outlet opening is defined in the vicinity of the inlet opening and in a middle portion of which a shaped transverse annular surface is formed. A movable body is arranged in the passage and co-operates in the manner of a flow throttling member with the transverse annular surface so as to define for the liquid flowing from the inlet opening to the outlet opening a flow cross section variable depending on the pressure of the liquid at the inlet of the support body. The movable body co-operates moreover in the manner of a obturator with the seat and a return spring tends to push it against this seat away from said shaped annular surface.

3 Claims, 1 Drawing Sheet

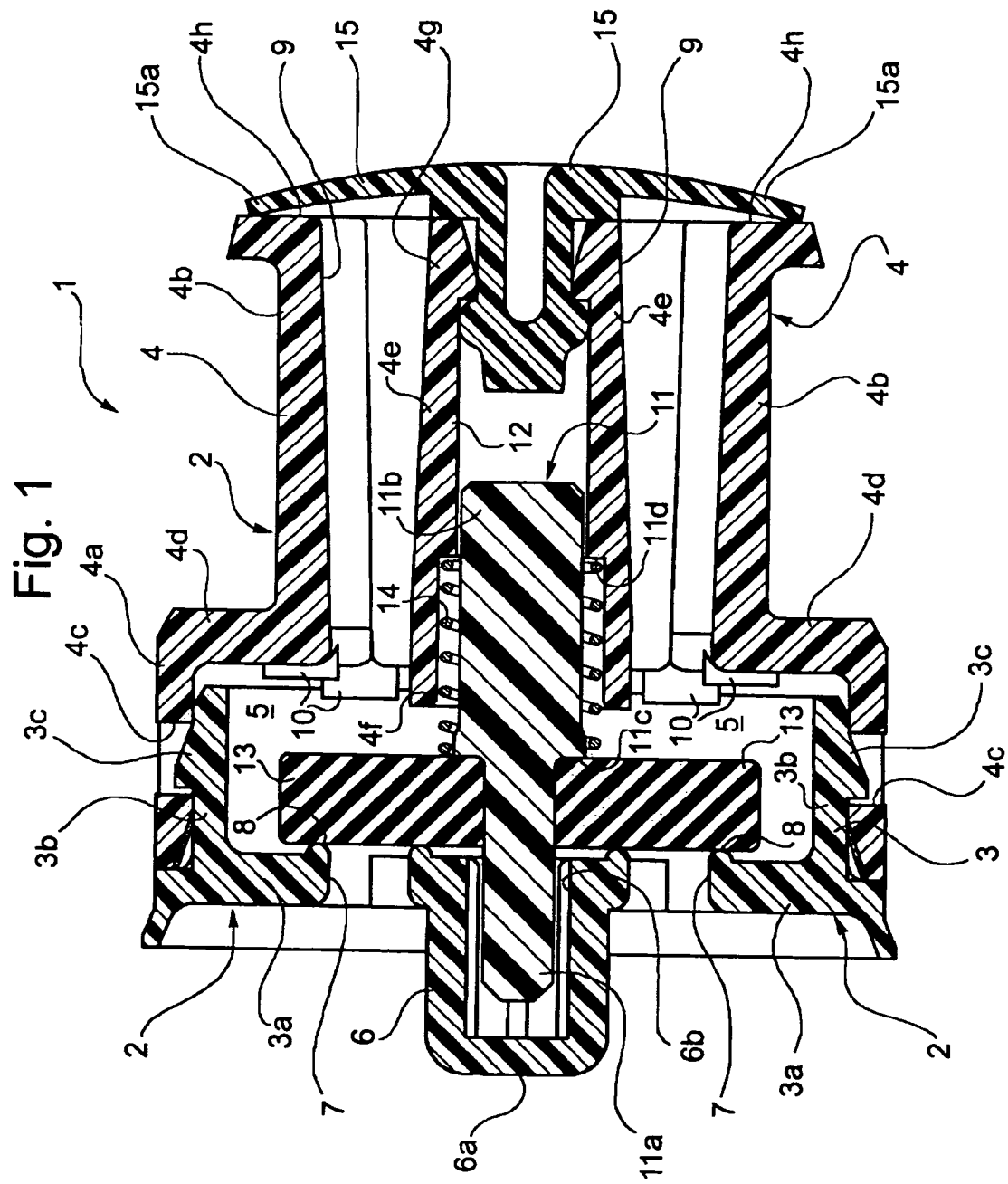

FLOW REGULATING DEVICE

BACKGROUND OF THE INVENTION

The present invention relates to a flow regulating device, in particular a device for regulating the flow of a liquid for use in an electric household appliance.

SUMMARY OF THE INVENTION

One object of the invention is to provide an improved flow regulating device which has a structure simple and inexpensive to produce and which is very reliable in terms of operation.

This and other objects are achieved according to the invention with a flow regulating device comprising:

an operationally stationary support body which has, defined inside it, a passage for a flow of liquid with at least one inlet opening and one outlet opening for the flow and in which at least one valve seat directed towards the outlet opening is defined in the vicinity of the inlet opening and in a middle portion of which a shaped transverse annular surface is formed;

a body mounted movably in said passage and able to co-operate, in the manner of a flow throttling member, with the abovementioned transverse annular surface, so as to define for the liquid flowing from the inlet opening to the outlet opening a variable flow cross section depending on the pressure of the liquid at the inlet of the stationary body and able to co-operate moreover in the manner of a movable obturator with said at least one seat; return means being associated with said body and tending to push it against said seat away from the abovementioned shaped annular surface.

Conveniently, an outlet obturator member is associated with the outlet opening of said passage and is able to prevent the backflow of the liquid towards the inlet opening.

BRIEF DESCRIPTION OF THE DRAWINGS

Further characteristic features and advantages of the present invention will emerge from the detailed description which follows, provided purely by way of a non-limiting example, with reference to the accompanying drawing in which a flow regulating device according to the invention is shown in an axially sectioned view.

In FIG. 1 a flow regulating device according to the present invention is denoted overall by 1.

DETAILED DESCRIPTION OF THE INVENTION

This flow regulating device 1 comprises a support body 2, which is operationally stationary and is formed by two parts 3 and 4, for example made of moulded plastic, which are joined together by means of snap-engagement and in a liquid-tight manner. In the example of embodiment shown, the body 3 is essentially cup-shaped and has an end wall 3a and a cylindrical side wall 3b. This side wall has externally a plurality of engaging teeth 3c snap-engaged inside corresponding openings 4c of the part 4. The latter has an essentially tubular shape, with two end portions 4a and 4b which are connected together in the region of a middle annular wall 4d.

The portion 4a of the part 4 has a greater diameter than the portion 4b of the body 2.

A chamber denoted overall by 5 is defined between the parts 3 and 4 of the body 2.

The part 3 of the body 2 has a tubular formation 6 with a closed end 6a and the opposite end 6b which emerges inside the chamber 5.

A plurality of inlet openings 7 for a liquid flow is formed in the wall 3a of the part of the body 2 around the tubular formation 6. Respective raised valve seats denoted by 8 are formed on the side directed towards the chamber 5, around the edge of the openings 7.

The part 4 of the body 2 has a central axial tubular formation 4e, with an open end 4f which emerges inside the chamber 5 and the other end 4g which is likewise open and opens out towards the outside of the device 1.

An outlet passage for the liquid flow, denoted by 9, is defined in the part 4, around the tubular central formation 4e.

In general terms, a passage for the liquid flow which overall includes the chamber 5 and the outlet passage 9 described above is defined inside the body 2 of the flow regulating device.

The middle wall 4d of the body 2 has formed in it, on the side directed towards the chamber 5, a shaped transverse annular surface having a plurality of adjacent reliefs denoted by 10. In a manner known per se, these reliefs project axially from the wall 4d, by respective different amounts, in the direction of the part 3 of the body 2.

11 denotes a slider mounted in an axially displaceable manner inside the internal axial cavity 12 of the tubular formation 4e. In the embodiment shown, this slider has a first end portion 11a which is guided in an axially slidable manner inside the tubular portion 6 of the inlet part 3 of the body 2 and a second end 11b which extends inside the cavity 12 of the formation 4e.

The end 11b of the slider 11 has a greater diameter than that of the end 11a and a shoulder 11c is defined between these ends.

13 denotes a movable body essentially in the form of an annular disc which is made of elastically flexible material. This part is fitted with interference onto the end 11a of the slider 11 and bears against the shoulder 11c of the latter.

A helical spring 14 is arranged around the end 11b of the slider and reacts on one side against the movable body 13 and on the other side against an internal transverse shoulder lid of the slider 11. This spring tends to push the movable body 13 into engagement with the valve seats 8 associated with the inlet openings 7. In the absence of a pressurized fluid supply at the inlet openings 7, the movable body 13 closes the seats 8, with which in fact it forms a series of hydraulic non-return or backflow prevention valves in parallel with each other.

When a pressurized liquid flow is supplied to the inlet openings 7, this flow is capable of causing a displacement of the movable body 13 and the associated slider 11 away from the seats 8, against the action of the return spring 14. The liquid flow is thus able to reach the chamber 5 and from here the outlet passage 9.

Depending on the pressure of the liquid which flows through the inlet openings 7, the movable body 13 is able, moreover, to be elastically flexed inwards so that its periphery tends to move towards the shaped annular inner surface of the middle wall 4d, namely towards the projections 10 of the latter. In this way, a flow cross section for the liquid, which varies depending on the pressure of the liquid supplied to the inlet openings 7 is defined between the chamber 5 and the outlet passage 9.

Therefore, the movable body 13, in addition to acting as a valve obturator also acts as a flow regulating member.

An outlet obturator 15 is engaged with the end 4g of the inner tubular formation 4e and has an elastically flexible peripheral cover 15a which presses at rest against the end front surface 4h of the part 4 of the body 2, forming together therewith a non-return valve able to prevent the backflow of the liquid towards the inlet openings 7.

The device 1 described above, in addition to the liquid flow regulating function, also performs the function of a dual non-return valve for preventing the backflow of the liquid towards the inlet openings.

Obviously, without affecting the principle of the invention, the embodiments and the constructional details may be widely varied with respect to that described and illustrated purely by way of a non-limiting example, the invention extending to all those embodiments which achieve the same usefulness owing to the same innovative ideas.

What is claimed is:

1. A liquid flow regulating device comprising: an operationally stationary body defining a passage having an axis, for a flow of liquid, with a transverse array of essentially coplanar inlet openings, arranged at a distance from said axis and in parallel with each other, and an outlet opening and in which a corresponding plurality of essentially coplanar valve seats directed towards the outlet opening are defined each in the vicinity of a respective inlet openings, a middle portion of said passage forming a shaped transverse annular surface facing said array of essentially coplanar inlet openings and said valve seats;

a movable body arranged in said passage and movable along said axis between said array of inlet openings and said shaped transverse annular surface, said moveable body being able to cooperate in the manner of a flow throttling member with said transverse annular surface so as to define for the liquid flowing from the inlet openings to the outlet opening a flow cross section variable depending on the pressure of the liquid at the inlet openings of said stationary body, said movable body being able to cooperate in the manner of an obturator with said essentially coplanar valve seats; and return means associated with said movable body for pushing said movable body against said seats away from said shaped annular surface wherein:

an outlet obturator member is associated with the outlet opening of said passage and is able to prevent the backflow of the liquid towards the inlet openings, said movable body is in the form of a ring or disc made with an elastically deformable material and supported by a slider mounted displaceably in a guided manner inside the stationary body, the stationary body is formed by two parts which are joined together by means of snap-engagement and in a liquid-tight manner, the stationary body has an outlet portion made in one piece, defining an outer tubular formation and an inner tubular formation coaxial with one another, the inner tubular formation defining an internal axial cavity, the slider having an end portion slidably engaged in a first end of said internal axial cavity, said return means comprising a spring disposed in said first end of said internal axial cavity, and said outlet obturator member has a shank engaged with the other end (4g) of said internal axial cavity.

2. Device according to claim 1, wherein said stationary body has axial tubular formations, wherein said movable body is mounted inside a chamber defined in the stationary body between said inlet openings and said shaped annular surface, and wherein the slider extends through said movable body and has at least one first and one second end directed towards the inlet opening and the outlet opening, respectively, and mounted slidably in a guided manner inside the respective axial tubular formations of the stationary body.

3. Device according to claim 2, wherein the plurality of inlet openings are arranged around the tubular formation in which the first end of the abovementioned slider is mounted; around each of said inlet openings there being defined a respective valve seat directed towards said chamber, with which the movable body cooperates during operation.

* * * * *